(154.)
CORNELIUS WALSH.
Broiler.
No. 121,917.            Patented Dec. 12, 1871.
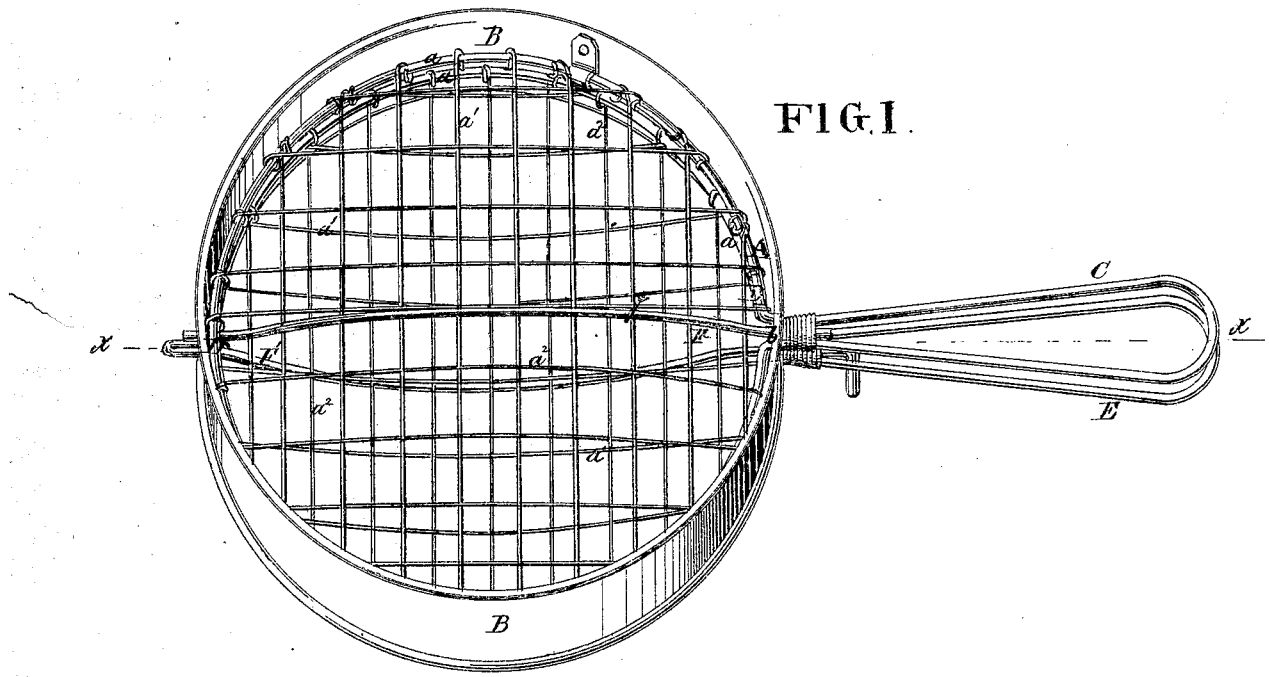
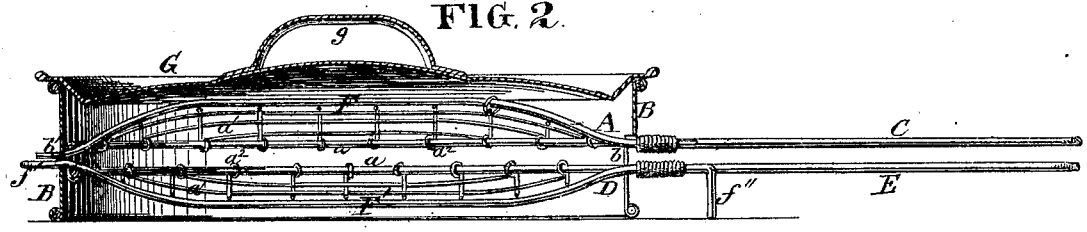
ATTEST
H. C. Elliott
Walter Allen
INVENTOR.
Cornelius Walsh

UNITED STATES PATENT OFFICE.

CORNELIUS WALSH, OF NEWARK, NEW JERSEY.

IMPROVEMENT IN BROILERS.

Specification forming part of Letters Patent No. 121,917, dated December 12, 1871.

*To all whom it may concern:*

Be it known that I, CORNELIUS WALSH, of Newark, in the county of Essex and State of New Jersey, have invented a new and Improved Broiler, of which the following is a specification:

The broiler comprises three parts: A meshed wire gridiron surrounded by a metallic case, to which said gridiron is attached; a detachable interior gridiron, also of meshed wire; and a removable top or cover, preferably of sheet metal. It is reversible, enabling it to be readily turned so as to expose each side alternately of the meat, fish, or other article placed therein to the action of the fire, in order that it may be equally cooked throughout and the escape of the juices prevented, while the removable cover prevents the escape of smoke into the apartment where the operation is performed.

Figure 1 is a perspective view of the broiler, the sheet-metal top being removed. Fig. 2 is a section at $x$ $x$, Fig. 1.

A represents the permanent gridiron, composed of a ring of stout wire, $a$, to which cross-wires $a^1$ $a^2$ (preferably corrugated) are connected in suitable manner. B is the annular casing to which the gridiron A is attached, and C a handle, which is preferably formed by a prolongation of the ring $a$ bent into a loop and passing through the slot $b$ in the casing B, which, for ease of construction, convenience, and economy is made in a single piece of sheet metal. A wire, F, secured at one end between the two branches of the looped handle and at the other to the casing B by passing through an aperture therein, serves to stiffen the bottom of the gridiron A. D is the detachable gridiron, also composed of a surrounding ring and transverse wires, arranged and connected in the same manner as the corresponding parts in the bottom A, and having a similar looped handle, E, also passing through the slot $b$ when the gridiron is in place, and a strengthening-wire or brace, F', whose inner end is prolonged so as to pass through the aperture $b'$ in the casing, serving, in connection with the downwardly-projecting heel $f''$ at the outer end of said wire, to support the gridiron D when the broiler is turned over in the position shown in Fig. 2, in conjunction with the heel $f''$, at the exterior end of said wire. G is the top, provided with a handle, $g$, for convenience of removal and replacement. The meat, fish, poultry, or other article of food to be cooked is laid on the permanent gridiron A, and the gridiron D and removable top G are put in place. This may be done either before or after setting the broiler over the fire.

When the substance being cooked is partially done on the under side the top G is removed and the broiler quickly turned, bringing the gridiron A uppermost, when the top G is immediately placed thereon. The gridiron D is prevented from falling out by the engagement of its projecting end $f'$ in the aperture $b'$, and the heel $f''$ resting on the top plate of the stove or other appropriate support; and it is obviously immaterial which side of the device is first applied to the fire.

The operation of turning may be repeated as often as necessary, and as this and the removal and replacement of the covers G may be performed with great rapidity, the cook is enabled to cause the meat to be equally cooked throughout, while by a proper quickness of manipulation the dripping of the juices and escape of smoke are prevented.

When the article is thoroughly cooked the broiler is taken from the fire and the contents transferred to a plate or dish by removing the sheet-metal top and gridiron D.

When desired the bottom part A B C and gridiron D may be used separately, each constituting a complete broiler by itself.

I claim as my invention—

1. The combination of the gridirons A and D within a reversible curb, which is so constructed as to adapt it either for the fire exposure or for a lid, substantially as described.

2. A reversible broiler, composed of a single annular casing, B, having an attached gridiron, A, and a detachable gridiron, D, provided with a brace, F', having a projection, $f'$, and heel $f''$, all constructed and arranged substantially as and for the purposes specified.

CORNELIUS WALSH.

Witnesses:
OCTAVIUS KNIGHT,
H. C. ELLIOTT.   (154)